United States Patent [19]

Wuppermann et al.

[11] Patent Number: 5,808,569

[45] Date of Patent: Sep. 15, 1998

[54] TRANSMISSION SYSTEM IMPLEMENTING DIFFERENT CODING PRINCIPLES

[75] Inventors: Friedhelm Wuppermann; Franciscus M. J. De Bont, both of Eindhoven, Netherlands

[73] Assignee: U.S. Philips Corporation, New York, N.Y.

[21] Appl. No.: 320,636

[22] Filed: Oct. 11, 1994

[30] Foreign Application Priority Data

Oct. 11, 1993 [BE] Belgium ................................ 09301077

[51] Int. Cl.⁶ ...................................................... H03M 7/00
[52] U.S. Cl. ................................................. 341/50; 395/2
[58] Field of Search .................................. 341/50, 83, 82; 348/422, 423, 408, 404, 397, 398; 395/2.12, 2.14, 2.24, 2.26

[56] References Cited

U.S. PATENT DOCUMENTS

| | | | |
|---|---|---|---|
| 4,811,398 | 3/1989 | Copperi et al. | 395/2.39 |
| 4,933,957 | 6/1990 | Bottau et al. | 375/27 |
| 4,949,383 | 8/1990 | Koh et al. | 381/31 |
| 5,001,758 | 3/1991 | Galand et al. | 395/2.21 |

FOREIGN PATENT DOCUMENTS

| | | |
|---|---|---|
| 0230001 | 7/1987 | European Pat. Off. . |
| 2605306 | 8/1977 | Germany . |
| 2188820 | 10/1987 | United Kingdom . |

OTHER PUBLICATIONS

CCITT Recommendation G.728 "Coding of speech at 16 kbit/s using low delay code excited linear prediction".

Draft International Standard ISO/IEC DIS 11172 "Information technology—Coding of moving pictures associated audio for digital storage media up to about 1.5 Mbit's", section 3, pp. 174–337.

*Primary Examiner*—Howard L. Williams
*Attorney, Agent, or Firm*—Leroy Eason

[57] ABSTRACT

A transmission system for encoded transmission of audio signals with frequency band compression. An input signal to be transmitted is divided into two spectral portions in a coder. One spectral portion is digitally encoded by a time-domain coder, and the other spectral portion is coded by a transform domain coder. The two digitally coded signals are then multiplexed for transmission as a composite digitally coded signal to a receiver. At the receiver the composite signal is demultiplexed and the two spectral portions thereof are respectively decoded by a time-domain decoder and a transformer-domain decoder. The decoded signals, covering the respective spectral portions, are then combined to reconstitute the originally transmitted audio signal.

9 Claims, 7 Drawing Sheets

TRANSMISSION SYSTEM IMPLEMENTING DIFFERENT CODING PRINCIPLES

BACKGROUND OF THE INVENTION

The invention relates to a transmission system comprising a transmitter which includes a coder for coding an input signal, the coder comprising a time-domain coder for deriving a digitally coded signal from a spectral portion of the input signal, the transmitter likewise comprising transmitting means for transmitting the digitally coded signal through a transmit channel to a receiver which includes a decoder comprising a time-domain decoder for deriving a decoded signal from the digitally coded signal.

The invention likewise relates to a transmitter, a receiver, a coder and a decoder to be used in a transmission system of this type as well as a method of transmission coding and decoding.

A transmission system as defined in the opening paragraph is known from published UK Patent Application no. GB 2 188 820.

Such transmission systems are used, for example, for transmitting speech or music signals through channels that have a limited transmission capacity.

A first example of such a channel is a radio channel between a mobile station and a fixed base station. The available transmission capacity of this channel is limited because this channel is utilized by a great many users. A second example is a recording channel used on a magnetic, optical or other recording medium such as, for example, a ROM. The capacity is often limited here too.

In the transmitter of the transmission system known from said UK Patent Application a spectral portion of the input signal is converted by a time-domain coder to a digitally coded signal.

Examples of time-domain coders are coders implementing pulse code modulation, differential pulse code modulation, adaptive differential pulse code modulation, delta modulation, adaptive delta modulation, vector quantization (CELP) and coding methods implementing linear prediction. The digitally coded signal is sent to the receiver through the channel by the transmitting means which are used. The time-domain decoder derives a decoded signal from the coded signals.

A problem of the aforesaid prior-art transmission system is that the quality of the reconstituted signal is inadequate for certain applications because of the required high transmission rate.

SUMMARY OF THE INVENTION

It is an object of the invention to provide a transmission system as defined in the opening paragraph, in which the quality of the reconstituted signal is enhanced when the transmission rate is unchanged, or, with an unchanged quality of the reconstituted signal, the required transmission rate is reduced.

For this purpose, the invention is characterized in that the coder further comprises a transform domain coder for deriving a further digitally coded signal from a further spectral portion of the input signal, the transmitter also being arranged for transmitting the further digitally coded signal through the transmission channel to the receiver, which receiver comprises a transform domain decoder for deriving a further decoded signal from the further digitally coded signal, and combining means for deriving a reconstituted signal from the decoded signal and the further decoded signal.

The invention is based on the recognition that for certain spectral portions of the input signal a time-domain coder is optimal and that for other spectral portions a transform domain coder is optimal. Examples of transform domain coders are coders utilizing sub-band coding and various forms of coding utilizing a transformation of the time domain to another domain. Such transformations are, for example, the discrete Fourier transform, the discrete cosine transform or the discrete Walsh Hadamard transform. Psychoacoustical properties of the human auditory system may then be utilized or not. By utilizing a time-domain or transform domain coder respectively, for different spectral portions of the input signal, it is possible to enhance the quality of the reconstituted signal considerably.

It is noted that in German Patent Specification no. DE 26 05 306 C2 a transmission system is disclosed in which an input signal is split up into a spectral portion represented by a baseband signal and a further spectral portion represented by a plurality of sub-band signals. However, in that transmission system the relevant signals are transmitted in analog mode, so that no coders and decoders are necessary. It will be evident that the problem of digitally coding analog signals in the transmission system known from this German Patent Specification does not play any role whatsoever.

A preferred embodiment of the invention is characterized in that the frequencies situated in the spectral portion which is subjected to time-domain coding are lower than the frequencies situated in the further spectral portion which is subjected to transform domain coding.

Experiments have shown that the use of a time-domain coder in the low-frequency area from 0 Hz to several kHz and the transform domain coder for the higher frequency areas leads to a considerable enhancement of the quality of the reconstituted signal.

BRIEF DESCRIPTION OF THE DRAWINGS

The invention will be further explained with reference to the following drawings (like elements being denoted by like reference characters), in which.

DESCRIPTION OF THE PREFERRED EMBODIMENTS

Figure 1:
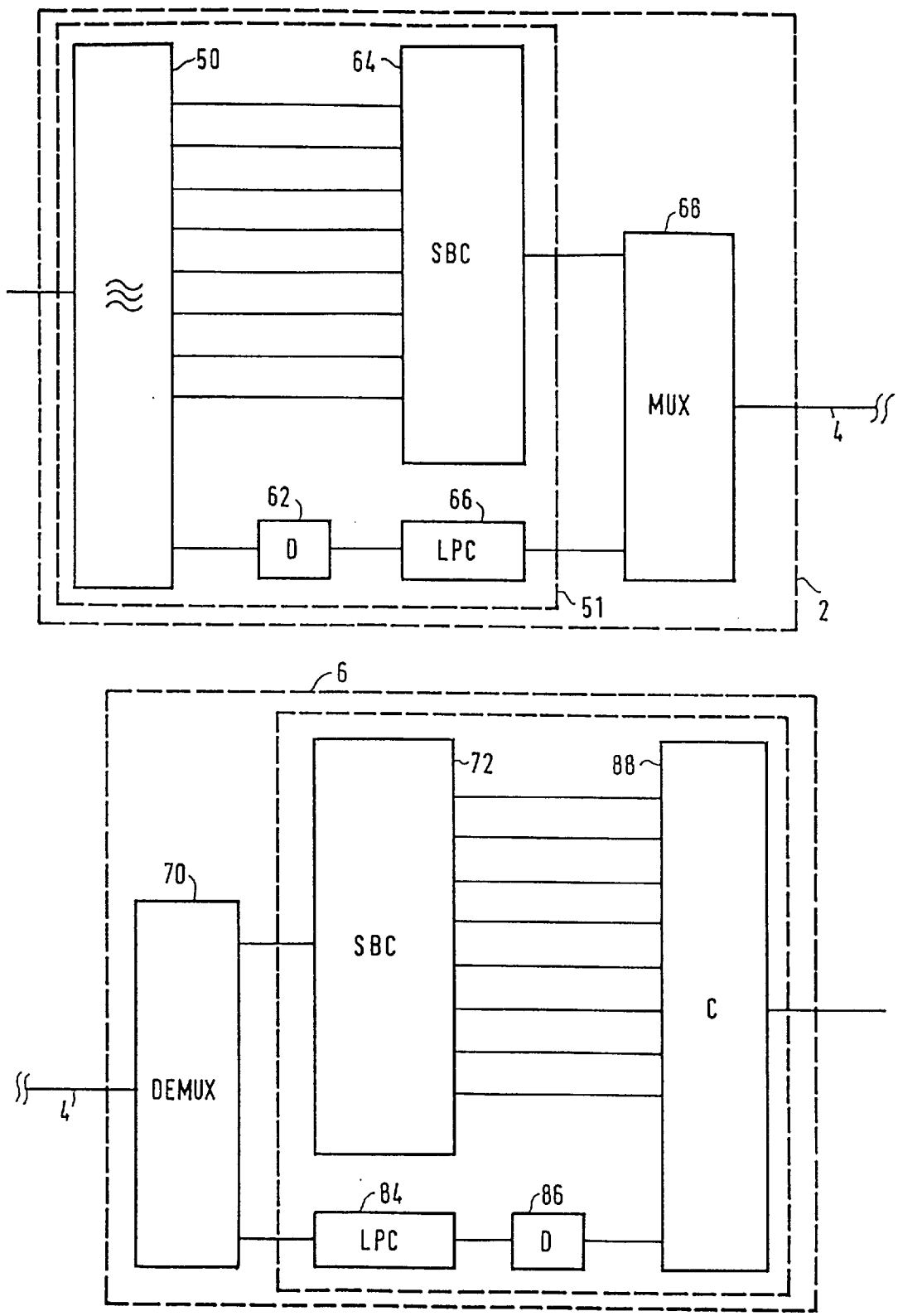
FIG. 1 shows a transmission system according to the invention.

In the transmission system shown in FIG. 1 the input signal is applied to a transmitter 2. The input of the transmitter 2 is connected to an input of filter means 50 in the coder 51. A first output of the filter means 50 is connected to an input of a delay element 62. The output signal on the first output of the filter means 50 represents the spectral portion of the input signal. An output of the delay element 62 is connected to an input of the time-domain coder in this case being a vector quantizer 66 which implements linear prediction (LPC: Linear Predictive Coding). An output of the vector quantizer 66, carrying the digitally coded signal for its output signal, is connected to a first input of the transmitter means in this case being a multiplexer 68.

A plurality of outputs of the filter means 50 are connected each to an input of a transform domain coder in this case being a sub-band coder 64. The input signals of the sub-band coder 64 collectively represent the further spectral portion of the input signal. An output of the sub-band coder 64, carrying the further digitally coded signal for its output signal, is connected to a second input of the multiplexer 68.

The output of the multiplexer 68 is connected, through channel 4, to an input of a receiver 6. In the receiver 6 the signal is applied to the input of a demultiplexer 70. A first output of the demultiplexer 70, carrying the digitally coded signal for its output signal, is connected to a time-domain decoder in this case being an inverse vector quantizer 84 which implements linear prediction. An output of the inverse vector quantizer 84, carrying the reconstituted signal for its output signal, is connected to an input of a time delay element 86. The output of the time delay element 86 is connected to a first input of the combining means 88. A second output of the demultiplexer 70 is connected to an input of the transform domain decoder, in this case being a sub-band decoder 72. A plurality of outputs of the sub-band decoder 72, carrying reconstituted signals for their output signals which collectively represent the further spectral portion of the input signal, are connected each to an input of the combining means 88. The reconstituted input signal is available on the output of the combining means 88.

The input signal of the transmission system shown in FIG. 1 is split up into a spectral portion and a further spectral portion by the filter means 50. The spectral portion is converted to a digitally coded signal by the vector quantizer 66. A suitable implementation of the vector quantizer 66 is described, for example, in CCITT Recommendation G.728 "Coding of speech at 16 kbit/s using low delay code excited linear prediction". This coder is based on the "analysis by synthesis" principle.

In this vector quantizer the input signal to be coded is sampled to obtain to successive segments each having a plurality of samples of the signal to be coded. A synthesis filter is used for generating a synthesized signal segment for each of a large number of codebook words stored in a codebook. The difference between an actual segment of the input signal and a synthesized signal segment is filtered by a perceptual weighting filter. The squared sum of the signal samples is calculated from a segment of output signal samples of the perceptual weighting filter.

This generation of the synthesized signal, the calculation of the difference between the input signal and the synthesized signal, the filtering by the perceptive weighting filter and the calculation of the squared sum is effected for each of the available 1024 codebook words. From these codebook words the codebook word is selected that yields the least squared sum.

The transfer function of the analysis filter is determined by making, by linear prediction, an estimate of the relation between successive signal samples in the four segments of the synthesized signal previous to the actual segment. The coded signal now comprises a codebook index of the selected codebook word. It is noted that the prediction parameters need not be transferred.

The further spectral portion of the input signal is represented by the sub-band signals on the output of the filter means 50. These sub-band signals are converted to the further digitally coded signal by the sub-band coder 64. It is noted that the sub-band signals on the output of the filter means 50 are baseband signals representing a passband signal in the appropriate sub-band. This baseband representation is advantageous in that the necessary samples per sub-band are determined by the bandwidth of the appropriate sub-band and not by the maximum frequency in the appropriate sub-band. A suitable implementation of the sub-band coder 64 for signals having a sampling rate of 48 kHz is known from Draft International Standard ISO/IEC DIS 11172 "Information technology—Coding of moving pictures associated audio for digital storage media up to about 1.5 Mbit/s", section 3, pp. 174–337. The sub-band signals on the input are converted to a digital signal by means of quantization. The sub-band signals are quantized with a number of levels that may be different for different sub-bands. The actual number of quantization levels used for each sub-band depends on the power of the relevant sub-band signal and the power of the sub-band signals of adjacent sub-bands. Use is then made of the property of the human auditory system that a weak signal near to a strong signal is inaudible. As a result, it is possible to quantize such a weak signal with considerably fewer quantization levels than the strong signal. Based on the power of the various sub-band signals a just audible noise level is calculated for each sub-band. The number of necessary quantization levels is determined for each sub-band signal in response to this noise level. The further digitally coded signal now comprises different quantized sub-band signals and information about the number of quantization levels of each sub-band. It is noted that said coder is arranged for coding a signal from 0–24 kHz. Since a spectral portion is coded by the time-domain coder, the sub-bands situated in this spectral area need not be coded. This may be simply effected by not allocating any bits to these sub-bands.

The multiplexer 68 combines the digitally coded signal and the further digitally coded signal to a single signal. The time delay element 62 is present for equalizing the delays of the spectral portions of the input signal that reach the multiplexer 68 along two paths. The transmitter transmits this combined signal to the receiver through the channel. In the receiver the combined signal is split up again to the digitally coded signal and the further digitally coded signal. The digitally coded signal is converted to a reconstituted signal by the inverse vector quantizer 84. A suitable implementation of the sub-decoder is described in said CCITT Recommendation G.728. In this inverse vector quantizer 84 the codebook word selected by the vector quantizer 66 is generated on the basis of the transmitted codebook index. The codebook word is converted to a decoded signal by a synthesis filter. The parameters of the synthesis filter are for this purpose derived by linear prediction from the four segments previous to the actual segment of the decoded signal. This is effected in similar manner to coder 66.

The further digitally coded signal is converted by the sub-band decoder 72 to a plurality of decoded sub-band signals available on the output of the sub-band decoder 72 itself. It is noted that these sub-band signals are baseband signals representing a bandpass signal in the relevant sub-band. This baseband representation is advantageous in that the necessary samples per sub-band are determined by the bandwidth of the relevant sub-band and not by the maximum frequency of this sub-band. The combining means 88 convert the sub-band signals to the desired sub-band frequency and thereafter combine these signals with the decoded signal to a reconstituted input signal.

Figure 2:
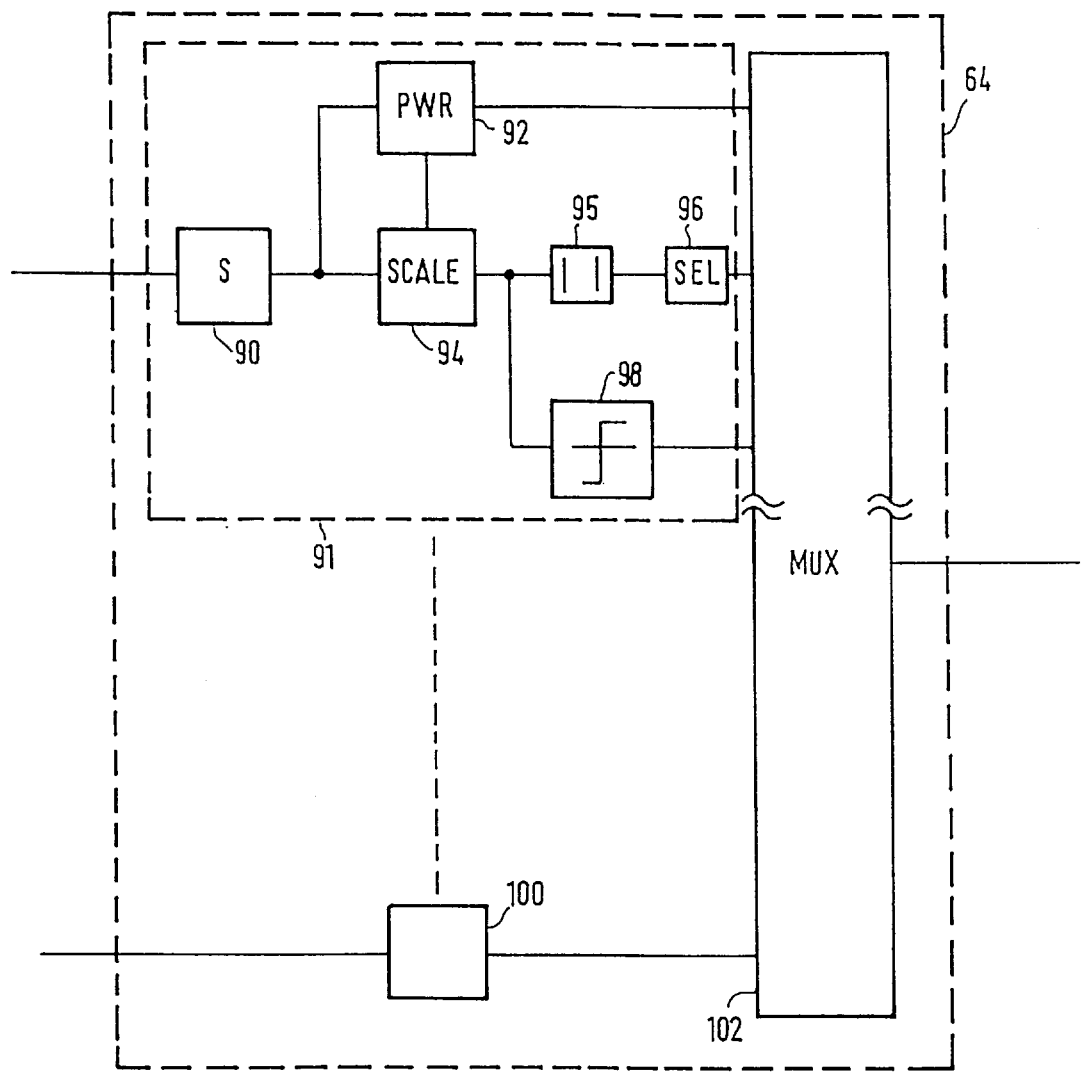
FIG. 2 shows a sub-band coder to be used in a transmission system as shown in FIG. 1.

In the sub-band coder 64 shown in FIG. 2 each of the sub-band signals is applied to its own sub-coder 91 . . . 100. The sub-coders 91 . . . 100 all have an identical structure. The input of the sub-coder 91 is connected to the segmenting means 90. The output of the segmenting means 90 is connected to an input of measuring means 92 and to an input of scaling means 94. A first output of the measuring means 92 is connected to a control input of the scaling means 94. A second output of the measuring means carrying a power measure for its output signal is connected to a first input of a multiplexer 102. The output of the scaling means 94 is connected to an input of an absolute value calculator 95 and to an input of sign determining means 98. An output of the absolute value calculator is connected to an input of a selecting means 96. An output of the selecting means 96, carrying an identification code of a selected reference envelope for its output signal, is connected to an input of the multiplexer 102. An output of the sign determining means is connected to a third input of the multiplexer 102. The output of the multiplexer 102 forms the output of the sub-band coder 64.

In an embodiment for the coder 51 intended for a transmission system for audio signals that have a maximum frequency of 8 kHz, the spectral portion comprises the frequency area from 0–2 kHz, while the further spectral portion comprises the frequency area from 2 kHz to 8 kHz. The further spectral portion is represented by the eight sub-band signals at the input of the sub-band coder 64. In the subcoders 91 . . . 100 the sub-band signals are segmented into segments having identical time durations, while the number of samples of the sub-band signal in a segment is proportional to the bandwidth of that sub-band signal. The frequency area of each sub-band and the corresponding number of samples per segment are given in Table 1. The time duration of the segment is 4 mS.

TABLE 1

| sub-band i | $f_{min}$ [kHz] | $f_{max}$ [kHz] | $\Delta f$ [kHz] | samples/segment |
|---|---|---|---|---|
| 1 | 2 | 2.5 | 0.5 | 4 |
| 2 | 2.5 | 3 | 0.5 | 4 |
| 3 | 3 | 3.5 | 0.5 | 4 |
| 4 | 3.5 | 4 | 0.5 | 4 |
| 5 | 4 | 5 | 1 | 8 |
| 6 | 5 | 6 | 1 | 8 |
| 7 | 6 | 7 | 1 | 8 |
| 8 | 7 | 8 | 1 | 8 |

In an embodiment of the coder 51 intended for a transmission system for audio signals that have a maximum frequency of 16 kHz, the spectral portion comprises the frequency area from 0–4 kHz, while the further spectral portion comprises the frequency area from 4 kHz to 16 kHz. The further spectral portion is represented by the eight sub-band signals at the input of the sub-band coder 64. In the sub-coders 91 . . . 100 the sub-band signals are also segmented into segments having identical time durations, while the number of samples of the sub-band signal in a segment are proportional to the bandwidth of that sub-band signal. The frequency area of each sub-band and the corresponding number of samples per segment are given in Table 2. The time duration of the segment is 2 mS.

TABLE 2

| sub-band i | $f_{min}$ [kHz] | $f_{max}$ [kHz] | $\Delta f$ [kHz] | samples/segment |
|---|---|---|---|---|
| 1 | 4 | 5 | 1 | 4 |
| 2 | 5 | 6 | 1 | 4 |
| 3 | 6 | 7 | 1 | 4 |
| 4 | 7 | 8 | 1 | 4 |
| 5 | 8 | 10 | 2 | 8 |
| 6 | 10 | 12 | 2 | 8 |
| 7 | 12 | 14 | 2 | 8 |
| 8 | 14 | 16 | 2 | 8 |

The measuring means 92 determine a power measure for the relevant segment of sub-band signal samples. This power measure is converted to a logarithmic power measure and the difference between the logarithmic power measures of an actual segment and the segment preceding that actual segment is coded by Huffmann coding. The Huffmann coded signal is applied to the multiplexer 68 and this signal is transmitted to the receiver 6. An alternative way of coding the power measure of the different sub-bands is coding the power measure of the specific sub-band and coding the power difference between the power of the relevant sub-band and that of the remaining sub-bands. In situations where the power measures of the different sub-bands are correlated, this leads to a considerable saving on transmission capacity. The scaling means 94 scale the sub-band signal samples in response to a control signal coming from the measuring means, so that the power of the segments on the output of the scaling means 94 has a constant value. The absolute value producer 95 produces the envelope of the output signal of the scaling means 94 and applies this envelope in segmented form to the selecting means 96. The selecting means compares the envelope of the output signal of the scaling means 94 with a number of reference envelopes and selects the reference envelope that corresponds most to the envelope of the output signal of the scaling means 94. The selecting means produces on its output an identification code of the selected reference envelope. This identification code is applied to the multiplexer 102 for transmission to the receiver 6. In the sub-bands in which four sub-band signal samples are used per segment, five reference envelopes are used; whereas in the sub-bands in which eight sub-band signal samples are used per segment, eleven reference envelopes are used.

A number of reference envelopes used in the sub-bands with eight sub-band signal samples may vary from one to eleven. As a result of the Huffmann coding of the power measure, the number of bits necessary for this power measure may differ from one segment to the next. If there is excessive transmission capacity as a result, this transmission capacity may be used for transmitting longer identification codes of reference envelopes, so that a larger number of reference envelopes may be used for coding the envelope of the output signal of the scaling means 94.

The sign determining means 98 determine the sign of the output signal of the scaling means 94. This sign is applied to the third input of the multiplexer 102 for transmission to the receiver 6. It is possible that for certain of the sub-bands the sign of the output signal of the scaling means 94 is not transmitted to the receiver, but instead is generated by a noise generator at the receiver end. This simplification has been found to be especially permissible for the higher sub-bands.

Figure 3:
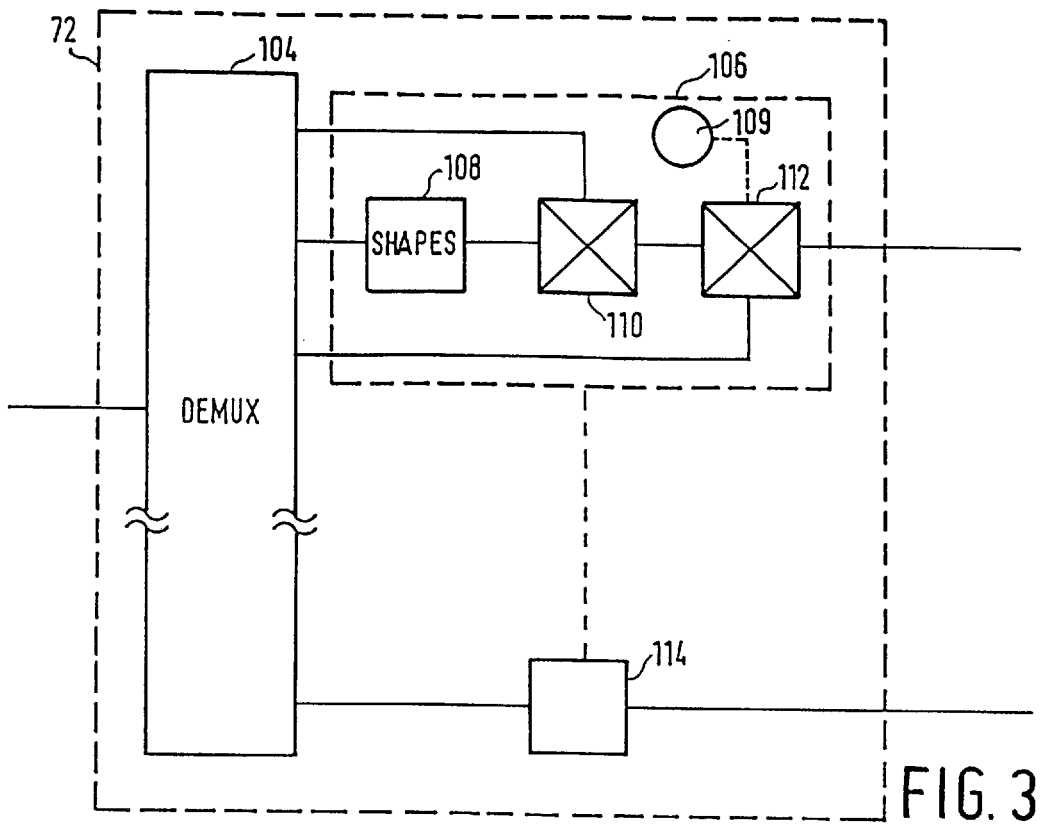
FIG. 3 shows a sub-band decoder to be used in a transmission system as shown in FIG. 1.

In the sub-band decoder 72 shown in FIG. 3 the output signal of the demultiplexer 70 (see FIG. 1) is applied to a further demultiplexer 104. Each of the sub-decoder stages 106 . . . 114 is supplied with three output signals of the demultiplexer 104. A first one of these outputs is connected to a reference envelope generator 108. A second one of these outputs is connected to a first input of a multiplier circuit 110 and a third one of these outputs is connected to a first input of a multiplier circuit 112. Alternatively, however, it is conceivable that the third output of the multiplexer 104 is not present, but that the first input of the multiplier circuit 112 is connected to an output of a noise generator 109. An output of the reference envelope generator 108 is connected to a second input of the multiplier circuit 110. An output of the multiplier circuit 110 is connected to a second input of a multiplier circuit 112. The output of the multiplier circuit 112 forms one of the decoded sub-band signals. The sub-decoders 106 . . . 114 are structured in similar manner.

The reference envelope generator 108 generates the selected reference envelope in response to the received identification code. The multiplier circuit 110 multiplies the selected reference envelope by the power measure, so that a reconstituted envelope of the sub-band signal concerned is obtained. The reconstituted envelope of the sub-band signal is multiplied in the multiplier circuit 112 by the received sign of the sub-band signal samples, so that the decoded sub-band signal is available on the output of the multiplier circuit 112. For sub-bands in which the sign of the samples of the sub-band signal is not transferred, the multiplier circuit 112 multiplies the output signal of the multiplier circuit 110 by the output signal of the noise source 109.

Figure 4:
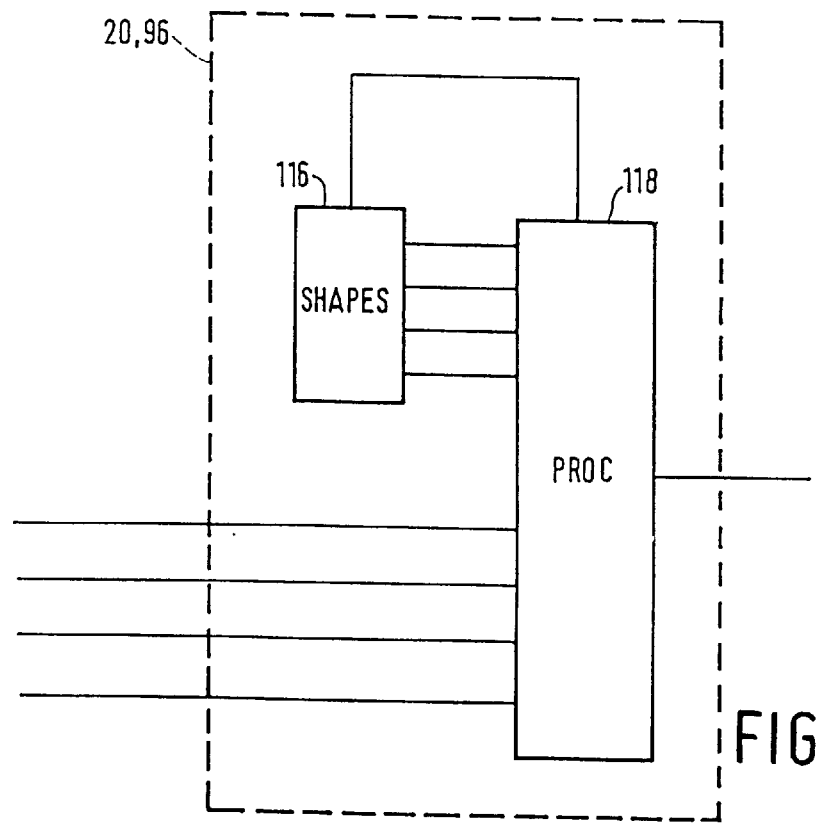
FIG. 4 shows selecting means to be used in the sub-band coder as shown in FIG. 2.

In the selecting means 96 shown in FIG. 4, four inputs carrying for their input signals four absolute values of the scaled sub-band signal combined to one segment are connected to four inputs of a processor 118. In FIG. 2 these four inputs of the selecting means 96 are symbolically shown by a single input. A first output of the processor 118, carrying an address signal for its output signal, is connected to an input of a ROM 116. Four outputs of the ROM 116, carrying four values that represent the reference envelope for their output signals, are connected to four further inputs of the processor 118. A second output of the processor 118, carrying the identification code of the reference envelope for its output signal, forms the output of the selecting means 96.

It is assumed that in the selecting means 96 shown in FIG. 4 the envelope of the output signal of the scaling means 94 (in FIG. 2) is represented by four values of this envelope at successive instants. It is also assumed that each of the reference envelopes is represented by four values thereof at successive instants. In the selecting means 96 the processor generates successive addresses for the ROM 116. This ROM 116 supplies, in the form of four values, the reference envelope stored at such an address. The processor 118 reads the values that represent the reference envelope and the envelope of the output signal of the scaling means 94. The processor 118 produces a difference measure between the two envelopes which measure is, for example, equal to the sum of the squared difference between the corresponding values represented by the envelopes. The processor successively generates the addresses of all the reference envelopes to be used in the comparison, and produces on a second output the identification code of the reference envelope having a minimized difference measure. It is observed that for the sub-bands in which the envelopes are represented by eight signal samples, the selecting means are to have eight inputs. The ROM 116 therefore will then have eight outputs, and the input ports of the processor 118 will then also have eight inputs.

Figure 5:
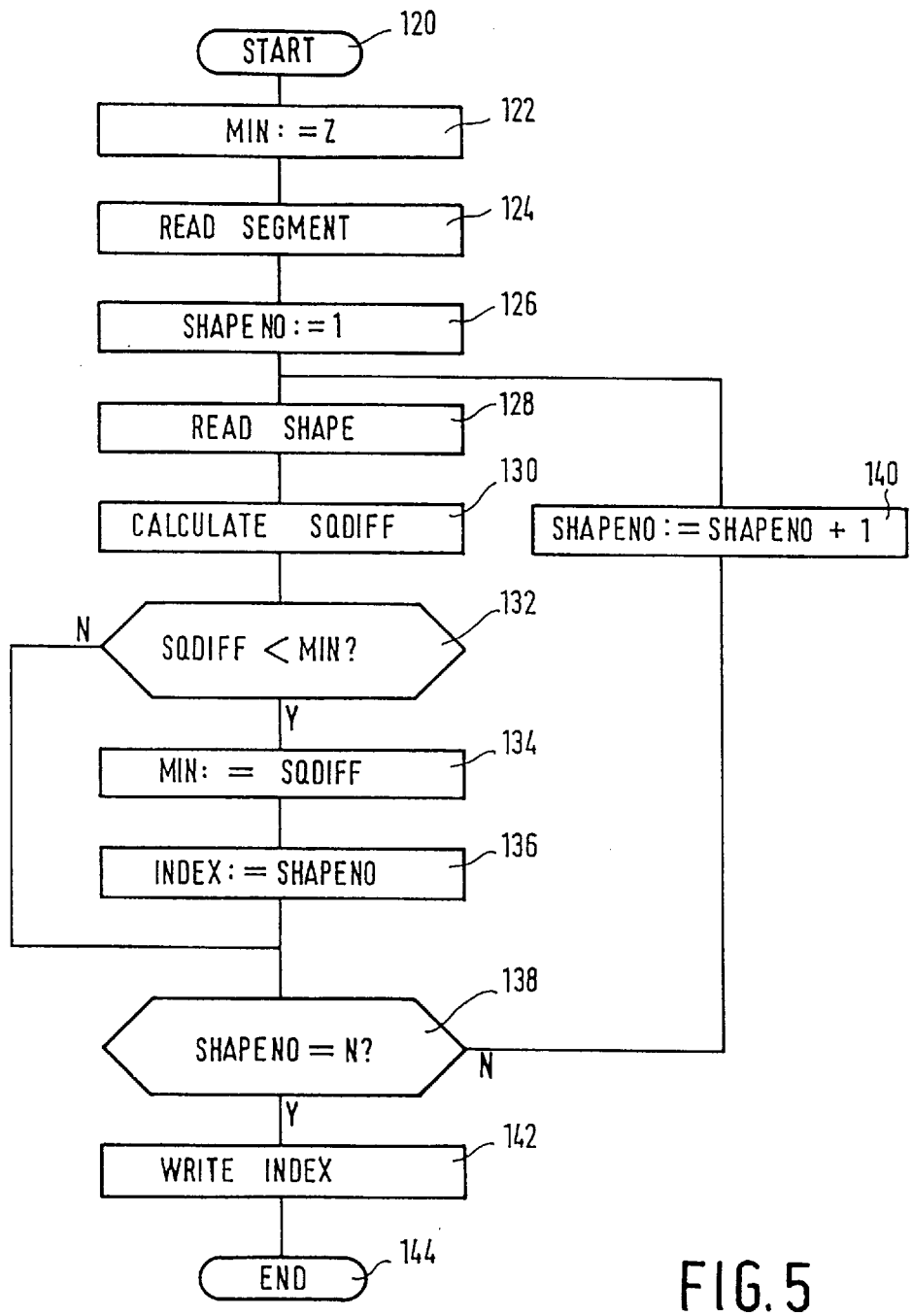
FIG. 5 shows a flow chart of a program to be used in the processor 118 in the selecting means as shown in FIG. 4.
Figure 6A:
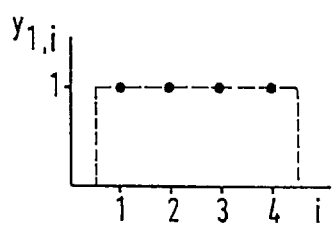
FIG. 6 is a graphical representation of the reference envelopes used in the coder and decoder as shown in FIGS. 2 and 3 which envelopes are represented by four values.
Figure 6B:
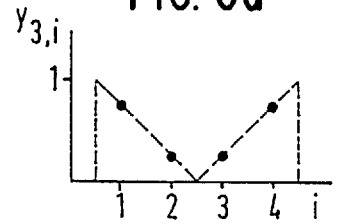
Figure 6C:
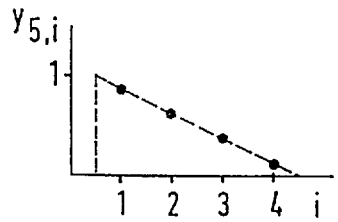
Figure 6D:
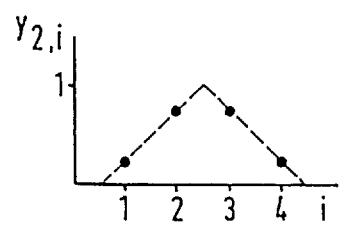
Figure 6E:
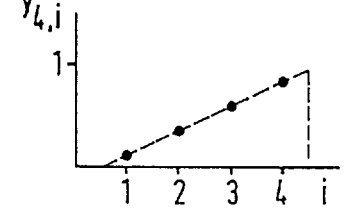
Figure 7A:
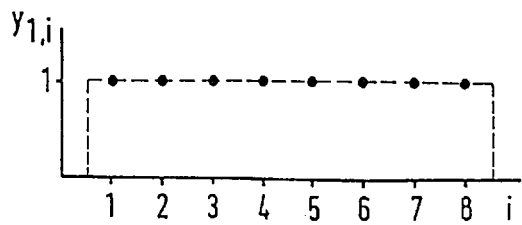
FIG. 7 is a graphical representation of the reference envelopes used in the coder and decoder as shown in FIGS. 2 and 3, which envelopes are represented by eight values.
Figure 7G:
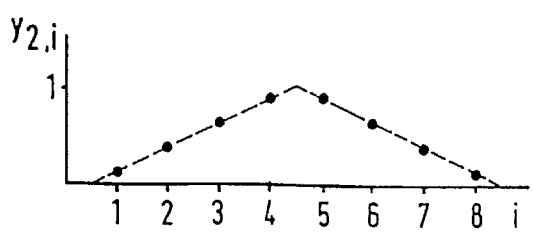
Figure 7B:
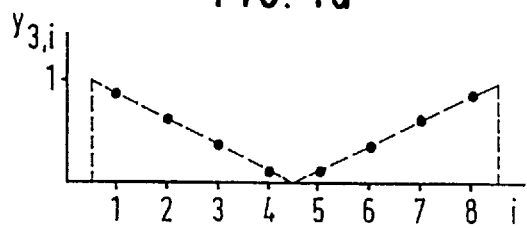
Figure 7H:
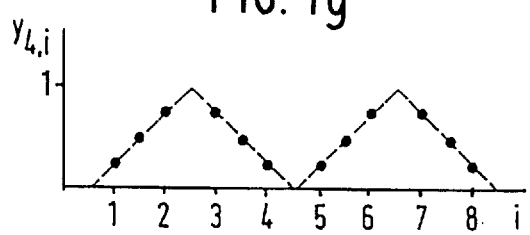
Figure 7C:
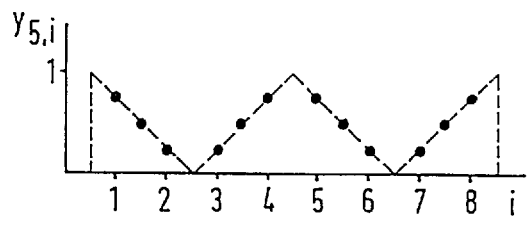
Figure 7I:
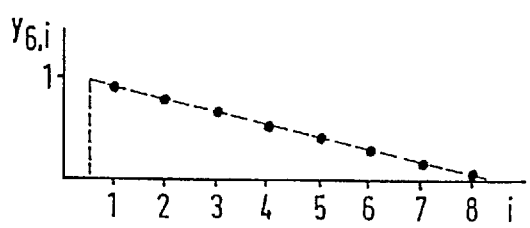
Figure 7D:
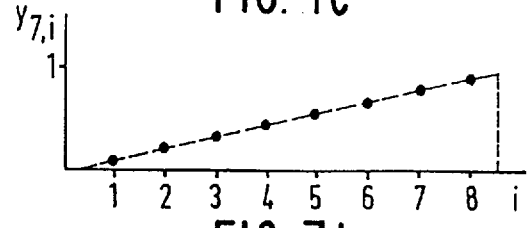
Figure 7J:
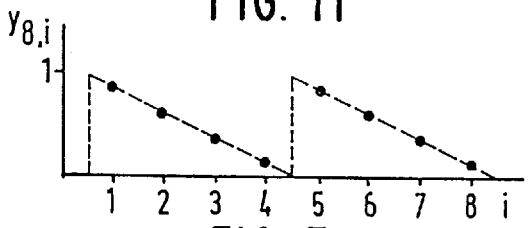
Figure 7E:
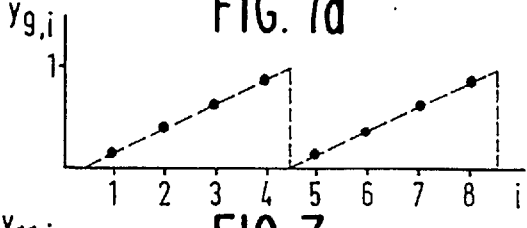
Figure 7K:
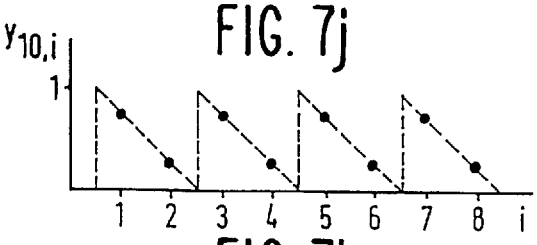
Figure 7F:
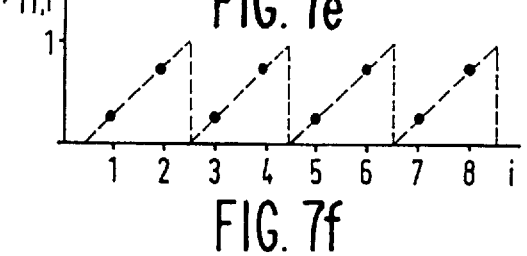

For performing said function, the processor 118 is programmed according to flow chart shown in FIG. 5. The numbered instructions have the connotation as indicated in the Table below.

| Nr. | Designation | Connotation |
| --- | --- | --- |
| 120 | START | Start of the program |
| 122 | MIN:=Z | The value of the variable MIN is made equal to a constant Z. |
| 124 | READ SEGMENT | The values representing the envelope of a segment are read. |
| 126 | SHAPENO:=1 | The first reference envelope is selected. |
| 128 | READ SHAPE | The values representing the reference envelope are read. |
| 130 | CALCULATE SQDIFF | The squared difference between the reference envelope and the segment envelope is calculated. |
| 132 | SQDIFF < MIN ? | A test is made whether SQDIFF is smaller than MIN. |
| 134 | MIN:=SQDIFF | The value of the variable MIN is made equal to the variable SQDIFF. |
| 136 | INDEX:=SHAPENO | The index of the thus far optimum reference envelope is stored. |
| 138 | SHAPENO=N ? | A test is made whether all reference envelopes have been compared with a segment envelope. |
| 140 | SHAPENO:=SHAPENO+1 | The next reference envelope is selected. |
| 142 | WRITE INDEX | The identification code of the selected reference envelope is put on the second output of the processor. |

The program according to the flow chart of FIG. 5 is carried out once for each segment of sub-band signal samples. In box 122 the variable MIN representing the minimum error measure is made equal to a number Z which is so large that the minimum difference measure is bound to fall short of this number Z. Subsequently, in box 124 the values representing the envelope of the segment are read out by the processor 118. In box 126 the address belonging to the first reference envelope is presented at the first output of the processor. In box 128 the values representing the reference envelope are read by the processor. In box 130 the difference measure between the envelope of the segment and the reference envelope is calculated. The difference measure SQDIFF can be calculated as follows:

$$SQDIFF = \sum_{i=1}^{L} (x_i - y_i)^2 \qquad (1)$$

In (1) i is a running variable, L the number of values that represent the envelope, $x_i$ the $i^{th}$ value of the values that represent the envelope of the segment, and $y_i$ the $i^{th}$ value of the values that represent the reference envelope.

In box 132 the value of SQDIFF is compared with the value of MIN. If the value of SQDIFF is smaller than the value of MIN, the actual reference envelope corresponds more to the envelope of the segment than the reference envelopes that have been previously compared with the envelope of the segment. In that case the value of MIN in box 134 is made equal to the value of SQDIFF. In addition, in box 136 the value of INDEX representing the identification code of the reference envelope thus far corresponding most is made equal to the identification code of the current reference envelope. If the value of SQDIFF is not smaller than the value of MIN, the boxes 134 and 136 are skipped.

In box 138 there is examined whether all reference envelopes have already been compared with the envelope of the segment of sub-band signal samples. If they have, the variable INDEX that is representative of the identification code of the reference envelope corresponding most to the envelope of the segment of sub-band signal samples is written in box 142. If not all the reference envelopes to be incorporated in the comparison have yet been compared with the envelope of the segment of sub-band signal samples, the next reference envelope is selected in box 140 and box 128 is leapt to.

It is noted that the coder and decoder may be fully implemented in hardware, but it is alternatively possible for the coder and/or decoder to be incorporated completely or in part in a signal processor. This signal processor is then controlled by suitable software.

FIG. 6 shows the five reference envelopes used for the sub-bands which sub-bands are represented by four values. The reference envelopes are represented by the values $y_{k,i}$, is where k is the serial number of the reference envelope and i is a serial number of the value that also defines the reference envelope. Experiments have shown that not all reference envelopes occur equally often. This phenomenon may be used for reducing, for example by means of Huffmann coding, the necessary transmission capacity for transmitting the identification code of the reference envelope.

In FIG. 7 the eleven reference envelopes used for the sub-bands that are represented by eleven values are shown. Here too experiments have shown that not all the reference envelopes occur equally often.

It is noted that, optionally, adaptive reference envelopes to be derived from the sub-band signal to be coded can be used in addition to or in lieu of fixed reference envelopes.

Figure 8:
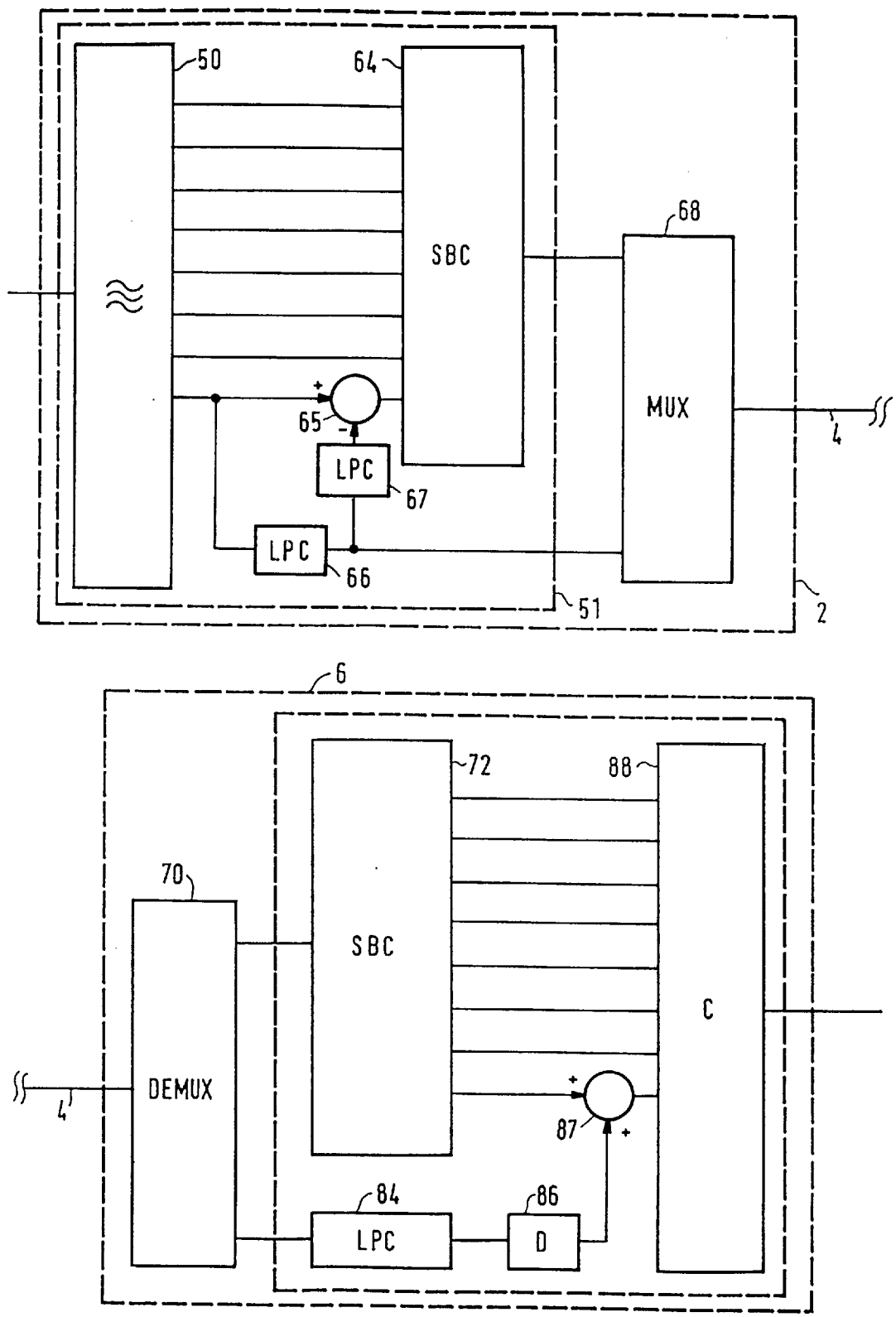
FIG. 8 is a modified transmission system according to the invention.

In the transmission system shown in FIG. 8 the input signal is applied to a transmitter 2. The input of the transmitter 2 is connected to an input of filter means 50 in the coder 51. A first output of the filter means 50 is connected to an input of a delay element 62 and to an input of a subtracter circuit 65. The output signal on the first output of the filter means 50 represents the spectral portion of the input signal. An output of the delay element 62 is connected to an input of the time domain coder in this case being a vector quantizer 66 which utilizes linear prediction (LPC: linear predictive coding). An output of the vector quantizer 66, carrying the first digitally coded signal for its output signal, is connected to a first input of the transmitter means in this case being a multiplexer 68, and to a time-domain decoder 67. An output of the time-domain decoder 67 is connected to a second input of the subtracter circuit 65.

A plurality of outputs of filter means 50, and the output of the subtracter circuit 65 are connected each to an input of a transform domain coder, in this case formed by a sub-band coder 64. The input signals of the sub-band coder 64 together represent a combination of the spectral portion and the further spectral portion of the input signal. An output of the sub-band coder 64 carrying the further digitally coded signal for its output signal is connected to a second input of the multiplexer 68.

The output of the multiplexer 68 is connected, through channel 4, to an input of a receiver 6. In the receiver 6 the signal is applied to the input of a demultiplexer 70. A first output of the demultiplexer 70, carrying the digitally coded signal for its output signal, is connected to a time-domain decoder, in this case being an inverse vector quantizer 84 which implements linear prediction. An output of the inverse vector quantizer 84, carrying the decoded signal for its output signal, is connected to an input of a time delay element 86. The output of the time delay element 86 is connected to a first input of an adder circuit 87. The output of the adder circuit 87 is connected to a first input of the combining means 88. A second output of the demultiplexer 70 is connected to an input of the transform domain decoder, in this case being a sub-band decoder 72. A plurality of outputs of the sub-band decoder 72, carrying reconstituted signals for their output signals which collectively represent the further spectral portion of the input signal, are connected each to an input of the combining means 88. An output of the sub-band decoder 72 which represents the spectral portion of the input signal is connected to a second input of the adder circuit 87. The reconstituted input signal is available on the output of the combining means 88.

The input signal of the transmission system shown in FIG. 8 is split up into a spectral portion and a further spectral portion by the filter means 50. The spectral portion is converted to a digitally coded signal by the vector quantizer 66. A suitable implementation of the vector quantizer 66 has already been explained with reference to FIG. 1. The digitally coded signal is converted to a decoded signal by the time-domain decoder 67 which decoded signal is subtracted from the spectral portion of the input signal by the subtracter circuit 65. On the output of the subtracter circuit is then a coding error signal available which represents a coding error of the time-domain coder.

The further spectral portion of the input signal is represented by the sub-band signals on the output of the filter means 50. These sub-band signals and the coding error signal on the output of the subtracter circuit 65 are converted to the further digitally coded signal by the sub-band coder 64. The extension by the time-domain decoder 67 and the subtracter 65 make it possible to code once again any coding error of the time-domain coder 66 by the sub-band coder 64 and transmit the coding error to the receiver. These measures make it possible to realise an improvement of the transmission quality. The additional complexity required for this purpose is little, because there is already a time-domain decoder available in an analysis-by-synthesis time-domain coder. It may be necessary to delay the input signal of the subtracter circuit 65 and the signals representing the further spectral portion for a certain period of time to provide that all input signals of the sub-band coder 65 have undergone the same period of delay.

It is noted that the sub-band signals on the output of the filter means 50 are baseband signals representing a bandpass signal in that particular sub-band. This baseband representation is advantageous in that the required samples per sub-band are determined by the bandwidth of that particular sub-band and not by the maximum frequency of that particular sub-band. A suitable implementation of the sub-band coder 64 for signals having a sampling rate of 48 kHz is known from draft internal ISO/IEC DIS 11172 "Information technology coding of moving pictures and associated audio for digital storage media up to about 1.5 Mbit/s", section 3 pages 174–337. The sub-band signals on the input are converted to a digital signal by means of quantization. The sub-band signals are quantized with a number of levels which may be different for different sub-bands. The actual number of quantization levels used for each sub-band depends on the power of that particular sub-band signal and the power of the sub-band signals of adjacent sub-bands. Use is then made of the property of the human auditory system that a weak signal near to a strong signal is inaudible. As a result, it is possible to quantize such a weak signal with considerably fewer quantization levels than the strong signal. Based on the power of the various sub-band signals a just perceivable noise level is calculated for each sub-band. The number of necessary quantization levels is determined for each sub-band in response to this noise level. The further digitally coded signal now comprises different quantized sub-band signals and information about the number of quantization levels of each sub-band. It is noted that said coder is arranged for coding a signal from 0–24 kHz. Since a 0–4 kHz spectral portion is coded by the time-domain coder, the sub-bands situated in this spectral area contain only the coding error signal which will have a relatively small amplitude. As a result, not more than a few bits will be allocated to these sub-bands so that there is hardly need for any additional transmission capacity to transmit this coding error signal.

The multiplexer 68 combines the digitally coded signal and the further digitally coded signal to a single signal. The time delay element 62 is present for equalizing the delays of the spectral portions of the input signal that reach the multiplexer 68 along two paths. The transmitter transmits this combined signal to the receiver through the channel. In the receiver the combined signal is split up again into the digitally coded signal and the further digitally coded signal. The digitally coded signal is converted to a first reconstituted signal by the inverse vector quantizer 84. A suitable implementation of the sub-decoder is described in said CCITT Recommendation G.728.

The further digitally coded signal is converted by sub-band decoder 72 to a plurality of decoded sub-band signals. The lowest sub-band output signal (0–4 kHz) that represents the coding error signal is added by the adder circuit 87 to the decoded signal on the output of the delay element 86 to obtain the decoded signal.

It is noted that the sub-band signals on the output of the sub-band decoder 72 are baseband signals which each represent a bandpass signal in that a particular sub-band. This baseband representation is advantageous in that the number of required samples per sub-band is determined by the bandwidth of that particular sub-band rather than by the maximum frequency of that particular sub-band. The combining means 88 convert the sub-band signals to the desired sub-band frequency and then combine the sub-band frequency signals with the decoded signal from adder 87 to obtain a reconstituted input signal.

We claim:

1. A transmission system comprising a transmitter and a receiver, characterized in that:

the transmitter includes coding means which comprises
a time-domain coder for deriving a single time-domain encoded digital signal by time-domain encoding of a first spectral portion of an input signal which is to be transmitted, said first spectral portion having a frequency band up to at least 2 kHz but not over 4 kHz; and
a transform-domain coder for deriving a transform-domain encoded digital signal by transform-domain encoding of a second spectral portion of said input signal, said second spectral portion having a frequency band above that of the first spectral portion and a substantially greater bandwidth;
said transform-domain coder comprising a plurality of sub-coders for respectively transform-domain encoding respective ones of a corresponding plurality of sub-bands of said second spectral portion; and the transmitter further includes means for multiplexing the time-domain encoded digital signal and the transform-domain encoded digital signal to obtain a transmission signal, and means for transmitting said transmission signal over a transmission channel to the receiver;

the receiver includes: means for demultiplexing the transmission signal to recover therefrom the time-domain encoded digital signal and the transform-domain encoded digital signal; decoding means which comprises a time-domain decoder for decoding the time-domain encoded digital signal to derive a first decoded signal representative of the first spectral portion of said input signal; and
a transform-domain decoder for decoding the transform-domain encoded digital signal to derive a second decoded signal representative of the second spectral portion of said input signal; and the receiver further includes combining means for reconstructing said input signal based on a combination of said first and second decoded signals.

2. Transmission system as claimed in claim 1, characterized in that the time-domain coder comprises a vector quantization coder and in that the time-domain decoder comprises a vector quantization decoder.

3. Transmission system as claimed in claim 2, characterized in that the time-domain coder further comprises linear prediction means.

4. Transmission system as claimed in claim 1, characterized in that the transform domain coder comprises a sub-band coder and in that the transform domain decoder comprises a sub-band decoder.

5. A method of transmission of an input signal from a transmitter to a receiver, comprising the steps of:

time-domain encoding a first spectral portion of the input signal to derive a single time-domain encoded digital signal, said first spectral portion having a frequency band up to at least 2 kHz but not over 4 kHz;

transform-domain encoding a second spectral portion of the input signal to derive a transform-domain encoded digital signal, said second spectral portion having a frequency band above that of the first spectral portion and a substantially greater bandwidth;

multiplexing the time-domain and transform-domain encoded digital signals to obtain a composite transmission signal which is transmitted to said receiver;

upon reception at said receiver, demultiplexing the transmission signal to recover therefrom said time-domain encoded digital signal and said transform-domain encoded digital signal;

subjecting the time-domain encoded digital signal to time-domain decoding to recover therefrom a first decoded signal representative of the first spectral portion of said input signal;

subjecting the transform-domain encoded digital signal to transform-domain decoding to recover therefrom a second digital signal representative of the second spectral portion of said input signal; and combining the recovered first and second digital signals to reconstitute said input signal therefrom.

6. A method of coding an input signal for transmission, comprising:

subjecting a first spectral portion of the input signal to time-domain encoding to derive a single time-domain encoded digital signal, said first spectral portion having a frequency band up to at least 2 kHz but not over 4 kHz;

subjecting a second spectral portion of the input signal to transform-domain encoding to derive a transform-domain encoded digital signal, said second spectral portion having a frequency band above that of the first spectral portion and a substantially greater bandwidth; and multiplexing the time-domain and transform-domain encoded digital signals to form a combined transmission signal.

7. A method of decoding a received digitally coded transmission signal, comprising:

demultiplexing the received transmission signal to derive therefrom a single time-domain encoded digital signal representative of a first spectral portion of a signal which is to be reconstituted, and a transform-domain encoded digital signal representative of a second spectral portion of said signal which is to be reconstituted, the first spectral portion having a frequency band up to at least 2 kHz but not over 4 kHz, the second spectral portion having a frequency band above that of the first spectral portion and a substantially greater bandwidth;

time-domain decoding the single time-domain encoded digital signal to thereby derive a first decoded signal;

transform-domain decoding the transform-domain encoded digital signal to thereby derive a second decoded signal, said decoding deriving from the transform-domain encoded digital signal a plurality of transform-domain encoded digital signals corresponding to respective sub-bands of said second spectral portion, and subjecting each of said sub-bands to transform-domain decoding; and combining the first and second decoded signals to form therefrom said signal which is to be reconstituted.

8. A transmitter which includes coding means for coding an input signal which is to be transmitted, the coding means comprising:

a time-domain coder for deriving a single time-domain encoded digital signal by time-domain encoding of a first spectral portion of the input signal, said first spectral portion having a frequency band up to at least 2 kHz but not over 4 kHz; and a transform-domain coder for deriving a transform-domain encoded digital signal by transform-domain encoding of a second spectral portion of the input signal, said second spectral portion having a frequency band above that of the first spectral portion and a substantially greater bandwidth;

said transform-domain coder comprising a plurality of sub-coders for respectively transform-domain encoding respective ones of a corresponding plurality of sub-bands of said second spectral portion; and the transmitter further including means for multiplexing the time-domain and transform-domain encoded digital signals to obtain a transmission signal.

9. A receiver which comprises:

demultiplexing means for deriving from a received transmission signal a time-domain encoded digital signal and a transform-domain encoded digital signal;

a time-domain decoder for decoding the time-domain encoded digital signal to derive a first decoded signal representative of a first spectral portion of a signal to be reconstructed, said first spectral portion having a frequency band up to at least 2 kHz but over 4 kHz;

a transform-domain decoder for decoding the transform-domain encoded digital signal to derive a second decoded signal representing a second spectral portion of the signal to be reconstructed, said second spectral portion having a frequency band above that of the first spectral portion and a substantially greater bandwidth;

said transform-domain decoder comprising a plurality of sub-decoders for respectively transform-domain decoding a corresponding plurality of transform-domain encoded digital signals corresponding to a plurality of sub-bands of said second spectral portion; and combining means for deriving the signal to be reconstructed based on a combination of the first and second decoded signals.

\* \* \* \* \*